(12) United States Patent
Ko et al.

(10) Patent No.: US 11,432,164 B2
(45) Date of Patent: Aug. 30, 2022

(54) COMPUTER SYSTEM FOR PROVIDING SERVICE CONSUMPTION PLAN FOR EFFICIENT SERVICE MIGRATION IN MOBILE EDGE COMPUTING ENVIRONMENTS, AND METHOD THEREOF

(71) Applicant: KOREA ADVANCED INSTITUTE OF SCIENCE AND TECHNOLOGY, Daejeon (KR)

(72) Inventors: In-Young Ko, Daejeon (KR); Moonyoung Lee, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 17/450,605

(22) Filed: Oct. 12, 2021

(65) Prior Publication Data

US 2022/0210665 A1    Jun. 30, 2022

(30) Foreign Application Priority Data

Dec. 30, 2020    (KR) .......................... 10-2020-0186969

(51) Int. Cl.
*H04W 16/22* (2009.01)
*H04L 67/04* (2022.01)
*H04L 67/51* (2022.01)

(52) U.S. Cl.
CPC ............. *H04W 16/22* (2013.01); *H04L 67/04* (2013.01); *H04L 67/51* (2022.05)

(58) Field of Classification Search
CPC ......... H04W 16/22; H04L 67/04; H04L 67/51

USPC ......................................................... 709/220
See application file for complete search history.

(56) References Cited

U.S. PATENT DOCUMENTS

2011/0177832 A1* 7/2011 Huang .................. G01S 5/02
                                                        455/457
2020/0358846 A1* 11/2020 Bonas ..................... H04L 67/51

OTHER PUBLICATIONS

Zhang, A Multi-Path Routing Protocol Based on Link Lifetime and Energy Consumption Prediction for Mobile Edge Computing, IEEE (14 pages) (Year: 2020).*

* cited by examiner

*Primary Examiner* — Wing F Chan
*Assistant Examiner* — Leon Y Tseng
(74) *Attorney, Agent, or Firm* — Heslin Rothenberg Farley & Mesiti, P.C.

(57) ABSTRACT

Various embodiments relate to a computer system for providing a service consumption plan for efficient service migration in a mobile edge computing (MEC) environment, and a method thereof. The computer system and the method may be configured to construct a graph representing edges indicating a plurality of road segments and a plurality of MEC servers covering the road segments, detect the service consumption plan for maximizing a ratio of a utilized journey time, which is served through at least one of the MEC servers for a total journey time, with respect to paths between a starting vertex and a goal vertex set by a user by using the graph, and provide the user with the service consumption plan.

20 Claims, 9 Drawing Sheets

Algorithm 1: Service Consumption Plan Optimization Algorithm

---

1  ServiceConsumptionPlanning (graph G, vertex $V_s$, vertex $V_g$, velocity v, tolerance_rate T, maximumGeneration)
2  population = generate_initial_population(G, $V_s$, $V_g$)
3  pastUtilizationRate = 0
4  while numGeneratio ≤ maximumGeneration do
5      winners, losers = selection(population)
6      child1, child2 = crossover(winners)
7      repair(child1, child2)
8      mutation(child1, child2)
9      population.append(child1, child2)
10     population.remove(losers)
11     numGeneration = numGeneraton + 1
12     if numGeneration % 50 = = 0 then
13         if averageUtilizationRate(population, G) ≤ pastUtilizationRate then
14             break
15         else
16             pastUtilizationRate = averageUtilizationRate(population, G)
17         end
18 end
19 result_plan = find_best_chromosome(population)
20 return result_plan

COMPUTER SYSTEM FOR PROVIDING SERVICE CONSUMPTION PLAN FOR EFFICIENT SERVICE MIGRATION IN MOBILE EDGE COMPUTING ENVIRONMENTS, AND METHOD THEREOF

CROSS-REFERENCES TO RELATED APPLICATIONS

This application is based on and claims priority under 35 U.S.C. § 119 to Korean Patent Application NO. 10-2020-0186969, filed on Dec. 30, 2020, the disclosure of which is herein incorporated by reference in its entirety.

TECHNICAL FIELD

Various embodiments relate to a computer system for providing a service consumption plan for efficient service migration in a mobile edge computing (MEC) environment, and a method thereof.

BACKGROUND OF THE INVENTION

Mobile edge computing (hereinafter referred to as "MEC") is a concept that places a cloud computing server to run at a network edge (e.g., access points or base stations). By deploying MEC servers at base stations near to users, MEC not only improves a user's perceived quality of service (hereinafter referred to as "QoS"), such as reduced latency, by responding to a user request at the network edge, but also mitigates the load of core networks. With these advantages, MEC is expected to achieve QoS requirements of latency-sensitive applications, compute-intensive applications, and high-bandwidth applications.

If a user leaves the coverage of a current MEC server, he or she cannot receive services directly from the MEC server, and therefore he or she does not experience benefits of an MEC environment. The faster the user moves, the greater the probability of leaving the coverage of the MEC server. Such a conflict between the high mobility of the user and limited coverage of a single MEC server may downgrade network performance, may decrease QoS, and even may cause the interruption of ongoing edge services. In order to assure service continuity, seamless service migration should be implemented. Service migration is a process of migrating an ongoing service from a hosting MEC server to a new MEC server that is close to a user.

Various service migration techniques have been developed to reduce a service downtime, which is the amount of time needed to pause a service due to the migration. However, migrations still consume a considerable amount of a service downtime, thus disrupting service provision. According to some studies, it takes more than 10 seconds to restart an application on a new MEC server after the migration. A non-negligible time used for migration degrades user experiences. Therefore, it is essential to avoid frequent service migrations during a service provision.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Various embodiments provide a computer system for providing a service consumption plan for efficient service migration in an MEC environment, and a method thereof.

In various embodiments, a method of a computer system may include constructing a graph representing edges indicating a plurality of road segments and a plurality of MEC servers covering the road segments, detecting the service consumption plan for maximizing a ratio of a utilized journey time, which is served through at least one of the MEC servers for a total journey time, with respect to paths between a starting vertex and a goal vertex set by a user by using the graph, and providing the user with the service consumption plan.

In various embodiments, a computer system includes a memory, and a processor connected to the memory and configured to execute at least one instruction stored in the memory. The processor may be configured to construct a graph representing edges indicating a plurality of road segments and a plurality of MEC servers covering the road segments, detect the service consumption plan for maximizing a ratio of a utilized journey time, which is served through at least one of the MEC servers for a total journey time, with respect to paths between a starting vertex and a goal vertex set by a user by using the graph, and provide the user with the service consumption plan.

In various embodiments, a non-transitory computer-readable storage medium may store one or more programs. The programs may execute constructing a graph representing edges indicating a plurality of road segments and a plurality of MEC servers covering the road segments, detecting the service consumption plan for maximizing a ratio of a utilized journey time, which is served through at least one of the MEC servers for a total journey time, with respect to paths between a starting vertex and a goal vertex set by a user by using the graph, and providing the user with the service consumption plan.

According to various embodiments, the computer system can provide a user with the service consumption plan for efficient service migration in an MEC environment. That is, the computer system can provide the service consumption plan for minimizing service migration latency during journey in order to provide the user with high quality services. Specifically, the computer system can detect the service consumption plan for maximizing a ratio of a utilized journey time, which is served through at least one of MEC servers for a total journey time, with respect to paths between a starting vertex and a goal vertex set by the user by using a graph. In this case, the computer system can detect the service consumption plan by using a genetic algorithm. Accordingly, the computer system can provide the user with the service consumption plan.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

While illustrative embodiments have been illustrated and described, it will be appreciated that various changes can be made therein without departing from the spirit and scope of the invention.

Hereinafter, various embodiments of this document are described with reference to the accompanying drawings.

1. Outline

Figure 1:
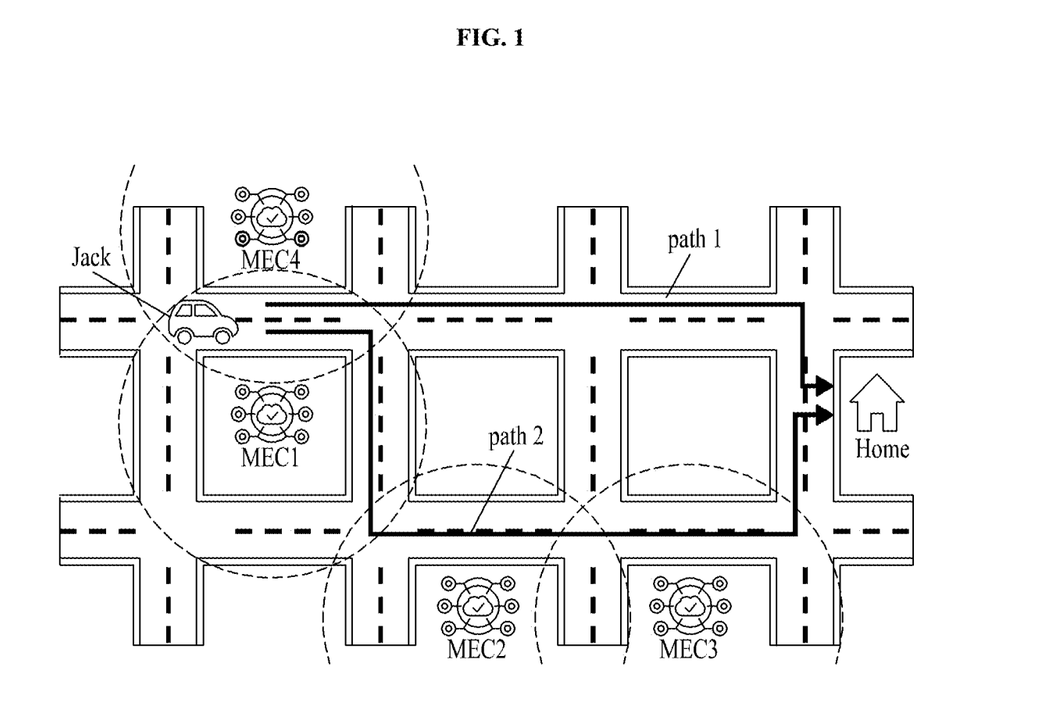
FIG. 1 is a diagram illustrating a situation in which a user uses a specific service in an autonomous vehicle.

FIG. 1 is a diagram illustrating a situation in which a user uses a specific service in an autonomous vehicle.

Referring to FIG. 1, in a high mobility situation, services are frequently migrated. Accordingly, the quality of user's experience of the services may be degraded.

The present disclosure proposes an algorithm to generate a service consumption plan that is composed of a series of road segments that a user (or an autonomous vehicle) may take and a sequence of MEC servers for connecting to obtain necessary services in each road segment. First, in the present disclosure, a graph-based model is constructed based on the road structure of a city. The graph includes geographic information of the city and the relation between the MEC servers and the road segments. A genetic algorithm (GA) is used to find a proper service consumption plan in order to maximize the utilization of the MEC servers during the user's journey.

The following autonomous vehicle scenario is considered. For example, Jack leaves his or her office and is about to return to his or her home. He or she boards an autonomous car, sets a driving mode as an automatic mode, and enters the address of his or her house as a destination. While driving, he or she wishes to play mobile game, that is, a latency-sensitive application that requires a fast response of MEC environments. FIG. 1 illustrates Jack's driving in an MEC environment. Although a path 1 is the shortest path from a Jack's location to his or her home, certain parts of the path 1 are not covered by MEC servers, resulting in the low utilization of MEC servers. A path 2 is longer than the path 1, but most part thereof is covered by MEC servers. If Jack drives home via the path 2, he or she derives more benefits from the MEC environment than from driving via the path 1. In addition, it is needed to decide which MEC server serves a part of the path. For example, if Jack drives via the path 2, starting the service through an MEC 4 at the beginning requires additional service migration during the journey compared to starting the service through an MEC 1.

In order to evaluate the proposed approach, simulations were performed by using a real-world data set. The proposed algorithm brings a better utilization rate than the greedy consumption model and the closest consumption model.

To the best of knowledge, there has been no research that recommends a path or guides a user to maximize benefits of MEC servers while considering service migration in an MEC environment. Previous studies have focused on developing strategies for service migration as a reaction to a user's journey. In contrast, the present disclosure attempted to provide the consumption plan to users before the beginning of the journey. It would be useful for a user who consumes services while moving in a vehicle.

The rest of the present disclosure is configured as follows. Section 2 describes a related work of service migration methods and strategies. In section 3, problems are formulated by clarifying a goal and setting constraints in MEC environments. In section 4, proposed methods are described in detail.

2. Related Work

In order to assure service continuity while a user moves in an MEC environment, a provided service needs to be migrated to a new MEC server located near the user. Edge servers are deployed at many different base stations. Accordingly, it is important to decide when to migrate and where to migrate. The existing research suggested a Follow-Me Cloud (FMC) concept that allows an ongoing service to follow a mobile user by migrating the service to an optimal edge server. In order to alleviate the trade-off between migration costs and quality of user experiences, in the research, an algorithm based on the Markov decision process for arranging service migrations was adopted. In the existing other researches, a module to decide service migration based on QoS prediction was developed. In this research, states, such as mobility patterns, request frequency, and a service downtime, were collected. Based on these states, after QoS was predicted, service migration was triggered when expected QoS is smaller than a QoS threshold. However, to the best of knowledge, there have been no studies to propose a method of generating the consumption plan to users before the beginning of a journey.

There are the existing researches to upgrade performance of service migration execution. Some research suggested a three-layered service migration method of shortening a service downtime and an overall migration time. Their method supported both virtual machine and container technologies. Another research introduced a framework to reduce the service handoff time of Docker container migration. In this research, common storage layers are shared using the layered storage system of Docker containers, thereby reducing synchronization overhead of a file system. However, a service provisioning plan for efficient service migration is necessary because more than 10 seconds of service downtime is still required for the migration of some applications.

3. Problem Formulation 3.1 Graph Construction

Figure 2:
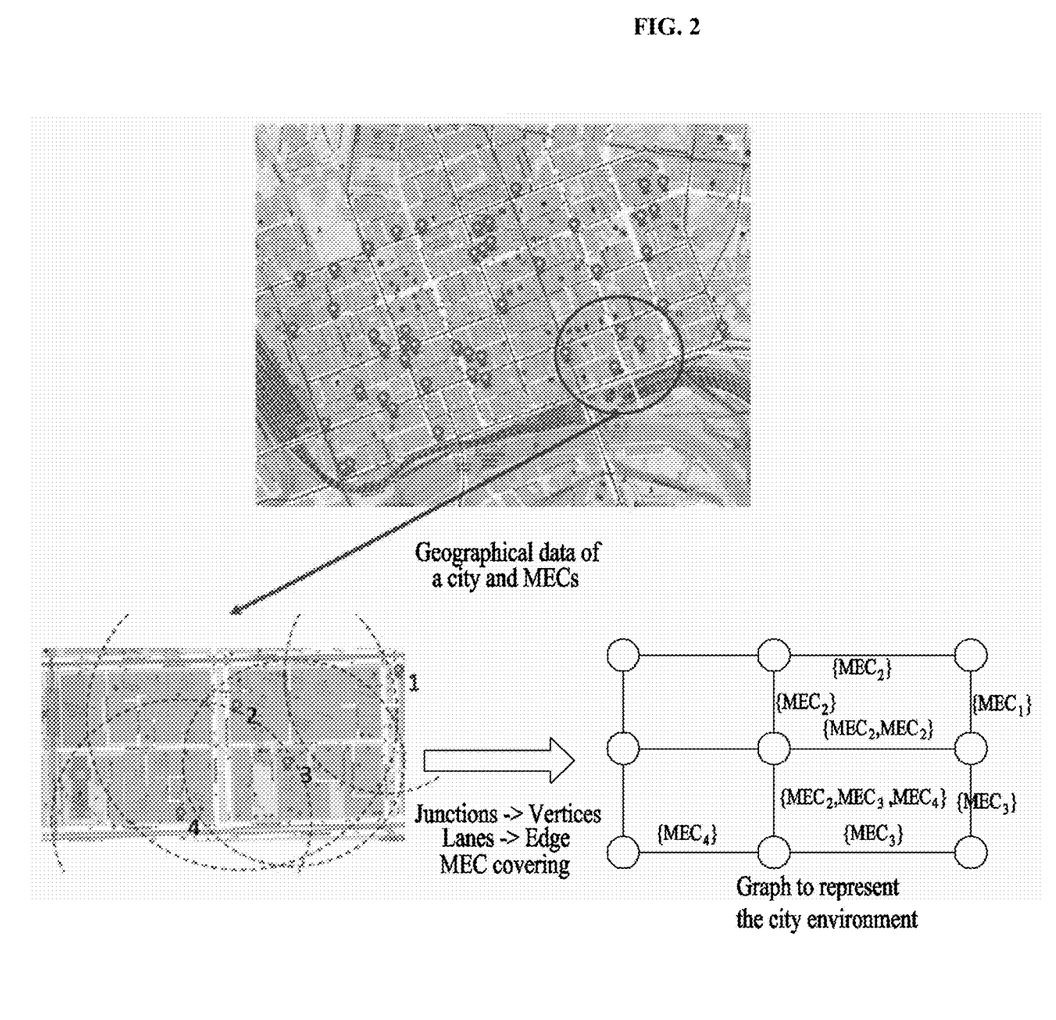
FIG. 2 is a diagram for exemplarily describing a graph construction according to various embodiments.

In the present disclosure, a graph including geographic information of a real city environment is constructed. FIG. 2 is a diagram for exemplarily describing a graph construction according to various embodiments. As illustrated in FIG. 2, vertices in the graph indicate areas (e.g., intersections) where different lanes cross each other. An edge describes a lane that connects two vertices. The edges are directed, and thus each edge has a source vertex and a destination vertex. In addition, each edge has a distance property indicative of a geographic distance between two vertices.

Furthermore, information of MEC servers deployed within a city is included in the graph. First, the properties of each MEC server are listed. The MEC server has longitude properties and latitude properties indicative of its geographical position. The MEC server also has a communication range property to describe a distance that may be directly accessed by the server over a radio access network. Each fair of MEC servers has a bandwidth property. Second, a covering concept is applied to describe the relationship between the edges and the MEC servers. An MEC server covers an edge when both the distance between a source vertex and the MEC server and the distance between a destination vertex and the MEC are smaller than its communication range property. Finally, each edge has a list of MEC servers, including a corresponding edge. This list indicates MEC servers which may be directly accessed by users on each edge.

3.2. Service Migration Time

In order to provide high-quality service to the users through MEC servers, it is necessary to minimize the delay of service migration during journey. In order to compute the time required for service migration from one MEC sever to another MEC server, the present disclosure propose a new analytic model of a service migration time. There are several studies that have analyzed service migration with container technologies from a required time perspective. Some studies showed that the migration time is composed of a dump time, a dump transfer time, and a resume time. The dump time is required to dump a current state on a source MEC server. After the dump phase, the dump transfer time is needed to transfer the dump to a destination MEC server. Finally, the resume time is necessary to restart an application at the destination MEC server based on a state dumped at the source MEC server.

Compared to the time needed to do this transfer, other kinds of times may be negligible. In addition, another study showed that the dump transfer time is highly dependent on a network condition between MEC servers. From these observations, the present disclosure define the time for a service Sk from a source MEC server Mi to a destination MEC server Mj as follows.

$$f(M_i, M_j, S_k) = \text{Process}(S_k) + \frac{\text{Volume}(S_k)}{B_{ij}} \quad \text{[Equation 1]}$$

In this case, the process ($S_k$) is the time taken to detect and process the service consumption plan for maximizing a ratio of a journey time used to be served through at least one of the MEC servers for a total journey time with respect to a path between a starting vertex and a goal vertex set by a user by using a graph that migrates the service ($S_k$). The volume (Sk) is a volume size of the service (Sk) to be transferred.

3.3. Service Consumption Plan Optimization Problem

In order to improve the quality of service, it is necessary to maximize the time taken to provide services to users directly through the MEC servers during their journeys. To this end, it is necessary to not only reduce a total service migration time, but also increase a proportion of a path covered by the MEC servers. To this end, an optimization problem is formed as in Equation 2. In this case, conditions for the optimization problems are given as in Equations 3 to 11.

$$\underset{(E_0, E_1 \ldots E_m),(M_0, M_1 \ldots M_m)}{\text{argmax}} \frac{\text{(utilized journey time)}}{\text{(total journey time)}} \quad \text{[Equation 2]}$$

$$\text{(utilized journey time)} = \frac{\sum_{i=1, M_i \notin cov(E_i)}^{m} dist(E_i)}{v} - S \quad \text{[Equation 3]}$$

$$\text{(total journey time)} = \frac{\sum_{i=1}^{m} dist(E_i)}{v} \quad \text{[Equation 4]}$$

$$S = \sum_{i=1}^{m} f(M_{i-1}, M_i, S_k) \quad \text{[Equation 5]}$$

$$f(M_i, M_j, S_k) = \begin{cases} 0, & \text{if } i = j, \\ \text{Process}(S_k) + \frac{\text{Volume}(S_k)}{B_{ij}} & \text{if } i \neq j \end{cases} \quad \text{[Equation 6]}$$

$$\text{Source}(E_0) = V_s, \text{Dest}(E_m) = V_g \quad \text{[Equation 7]}$$

$$\text{Dest}(E_{i-1}) = \text{Source}(E_i), \forall i \geq 1 \quad \text{[Equation 8]}$$

$$\text{Dest}(E_i) \neq \text{Dest}(E_j), \text{if } i \neq j \quad \text{[Equation 9]}$$

$$m \leq T \times \text{ShortestLength}(V_s, V_g) \quad \text{[Equation 10]}$$

$$\text{given } v, V_s, V_g, S_k, T \quad \text{[Equation 11]}$$

In this case, the utilized journey time indicates the time taken for a user to directly receive services through MEC servers during his or her journey. In Equation 3, cov($E_i$) indicates a list of MEC servers that cover an edge Ei. di(Ei) is a distance from the source vertex of the edge Ei to the destination vertex of the edge Ei. In Equation 5, S is defined as the sum of service migration times. Service migrations occur when a serving MEC server is changed, and such migrations are described in Equation 6. Equations 7, 8 and 9 indicate the constraints of edges. Sour(Ei) and Dest(Ei) indicate the source vertex of the edge Ei and the destination vertex of the edge Ei, respectively. Adjacent edges share a common vertex. A given starting vertex becomes the source vertex of the first edge, and a given goal vertex becomes the destination vertex of the last edge. A valid plan should not contain a cycle. In Equation 10, ShortestLength(Vs,Vg) indicates the number of edges that composes the shortest path between a starting vertex Vs and a goal vertex Vg. This value is calculated using a Dijkstra algorithm. T indicates a user-defined tolerance rate. A high tolerance rate means that a user is willing to take a longer path for better QoS. Thus, in the optimization problem, a ratio of a utilized journey time to a total journey time is maximized by finding a service provision plan consisting of a path made of edges E0, E1 . . . Em, and providing MEC servers M0, M1 . . . Mm.

In order to solve this problem, the present disclosure finds a service provision plan to maximize a ratio of a utilized journey to a total journey time by using a genetic algorithm.

3.4. Problem Hardness

The present disclosure may prove that a service consumption plan optimization problem is NP-complete.

Theorem 3.1. The service consumption plan optimization problem is NP.

Proof. Assuming a plan having a length m, its validity can be easily verified in a polynomial time (m). Therefore, the service consumption plan optimization problem belongs to an NP class.

Lemma 3.2. A problem of finding a simple path having a maximum number of vertices between two vertices in a graph is NP-hard.

Proof. The longest path problem, that is, a problem of finding a simple path having a maximum number of vertices may be transformed into a problem of finding the longest path for every pair of vertices in the graph. The transformed problem may be solved by repeatedly solving the problem of the lemma O($V^2$). Accordingly, the problem of the lemma is NP-hard.

Theorem 3.3. The service consumption plan optimization problem is NP-hard.

Proof. The present disclosure may prove that the service consumption plan algorithm is NP-hard by reducing the problem of the lemma 3.2 to a particular service consumption problem.

It is assumed that a graph is constructed as follows: All edges having a vertex V as a destination vertex are not covered by any MEC server, and all other edges are covered by an MEC server M0. If V is given as a goal vertex of the problem, the utilization rate of all valid plans having a length of m is $$100 \times \frac{m-1}{m}\%.$$

Accordingly, a valid plan having the longest length becomes a solution. In order to maintain the constraint of Equation 9, the length of a valid plan needs to be less than or equal to T×ShortestLength(Vs, Vg). If T is enough large, the longest simple path from Vs to Vg in the graph may be achieved by solving the problem. Therefore, the present disclosure can solve the problem of the lemma by solving a particular case of the service consumption optimization problem. That is, the service consumption optimization problem is NP-hard.

Theorem 3.4. The service consumption plan optimization problem is NP-complete.

Proof. According to Theorem 3.1 and Theorem 3.3, the service consumption plan optimization problem is NP and NP-hard. That is, the service consumption plan optimization problem is NP-complete.

4. Method

Since the service consumption plan optimization problem is NP-complete, the present disclosure uses a genetic algorithm (GA). The GA is a metaheuristic algorithm used to find solutions to routing search and optimization problems. In order to implement a GA for solving a certain kind of routing problems, a classical GA solution scheme is often modified. In addition, serving MEC servers need to be chosen to solve the service provision plan optimization problem. Thus, it is necessary to modify the GA scheme.

4.1. Genetic Representation

A chromosome of the proposed method consists of a sequence of pairs of edges and the IDs of MEC servers. Each edge indicates which edges constitute a journey, and the locus of the chromosome describes the order of the edges. The edge of the first locus should have a starting vertex designated as a source vertex. The starting vertex of another edge should be the destination vertex of a previous edge. The edge of the last locus should have a given goal vertex as a destination vertex. The IDs of the MEC servers of the chromosome indicate which MEC servers serve edges during journey. The length of the chromosome depends on a representing plan. However, the length of the chromosome needs to be smaller than a maximum length, which is established based on given tolerance requirements of a user.

Figure 3:
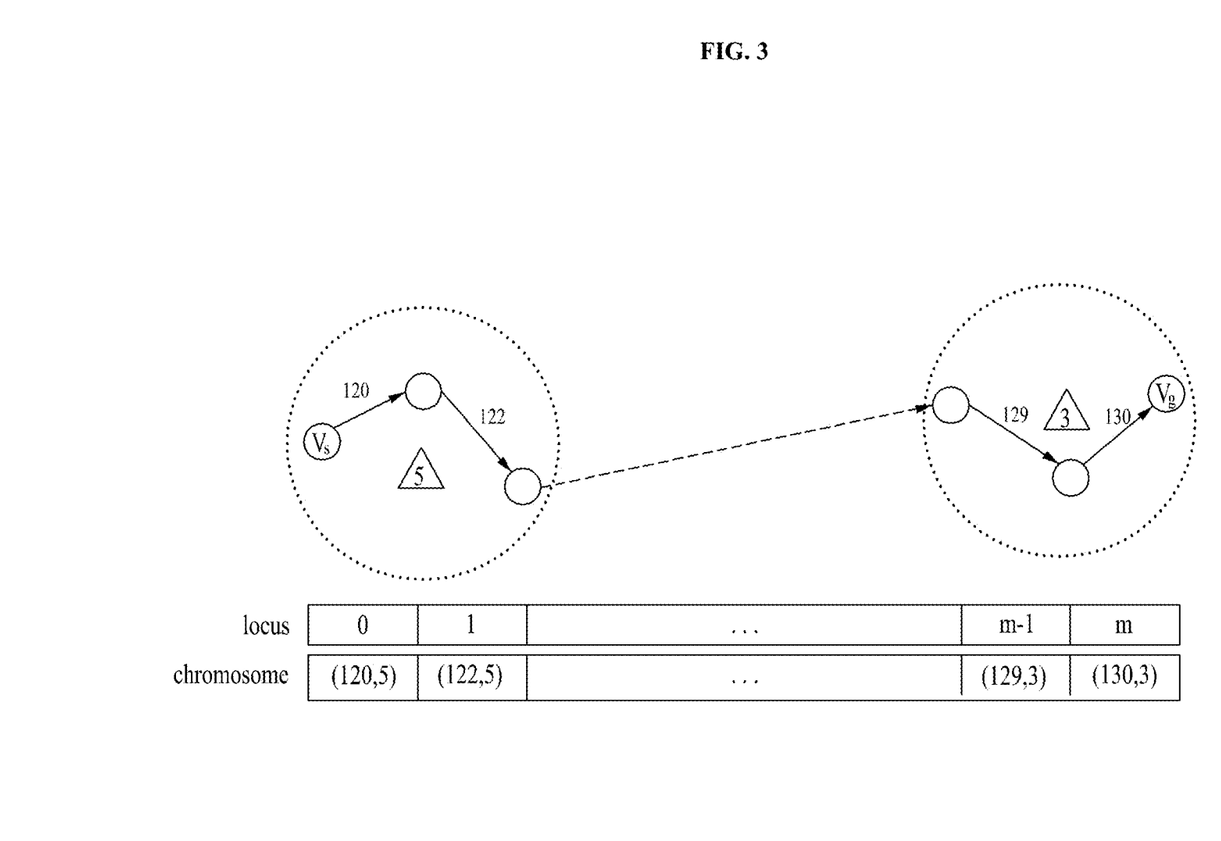
FIG. 3 is a diagram for exemplarily describing chromosomes of a genetic algorithm and a representing plan thereof according to various embodiments.

FIG. 3 describes an example of a chromosome and its representing plan according to various embodiments. An edge having an ID of 120 is the first edge of journey. The second edge is an edge having an ID of 122. The first and second edges are served by an MEC server having an ID of 5. A variable m is related to a total number of edges that constitute the journey.

4.2. Population Initialization

A population needs to be initialized to include various chromosomes in order to prevent the GA from generating a local optimal solution. Therefore, in the present disclosure, simple paths from a starting vertex to a goal vertex, which do not exceed a maximum length, are randomly selected. The simple path means a path that does not contain a loop. For each of edges constituting the paths, in the present disclosure, MEC servers to serve the paths are randomly selected among MEC servers that cover the edges.

4.3. Fitness Function and Selection

In the present disclosure, a fitness function was defined as Equation 2. This function was used to evaluate the fitness of a chromosome for a desired solution. In the present disclosure, a tournament selection method is used to select chromosomes among the population for reproduction. For each generation, in the present disclosure, two tournaments were held in which two chromosomes were randomly picked from the populations and a chromosome having a higher fitness value was selected. As a result, there were two winners, and two losers in the tournaments. The winners were used for the reproduction, and the losers were excluded from the population.

4.4. Crossover and Repair

In order to generate new child chromosomes, in the present disclosure, a crossover process was executed on the two winners from the above selection. Child chromosomes are required to present simple paths from a starting vertex to a goal vertex. Thus, in the present disclosure, the following crossover process was used for the winners.

In the present disclosure, the winners were called a parent 1 and a parent 2. First, common vertices shared by the path of the parent 1 and the path of the parent 2 were listed. Next, one vertex was randomly selected from the list of common vertices. By using the one vertex as a crossover point, one point crossover was performed. A path from a starting vertex to a selecting vertex in the parent 2 and a path from the selecting vertex to a goal vertex in the parent 2 were combined to generate a new chromosome child 1. Similarly, a child 2 was also generated. Serving MEC servers for each edge were preserved.

Although the crossover process ensured that newly created chromosomes presented paths from a starting vertex to a goal vertex, it did not guarantee that the paths were simple because the paths could have contained a loop. Thus, a repair process was required to eliminate a loop within the paths.

Figure 4:
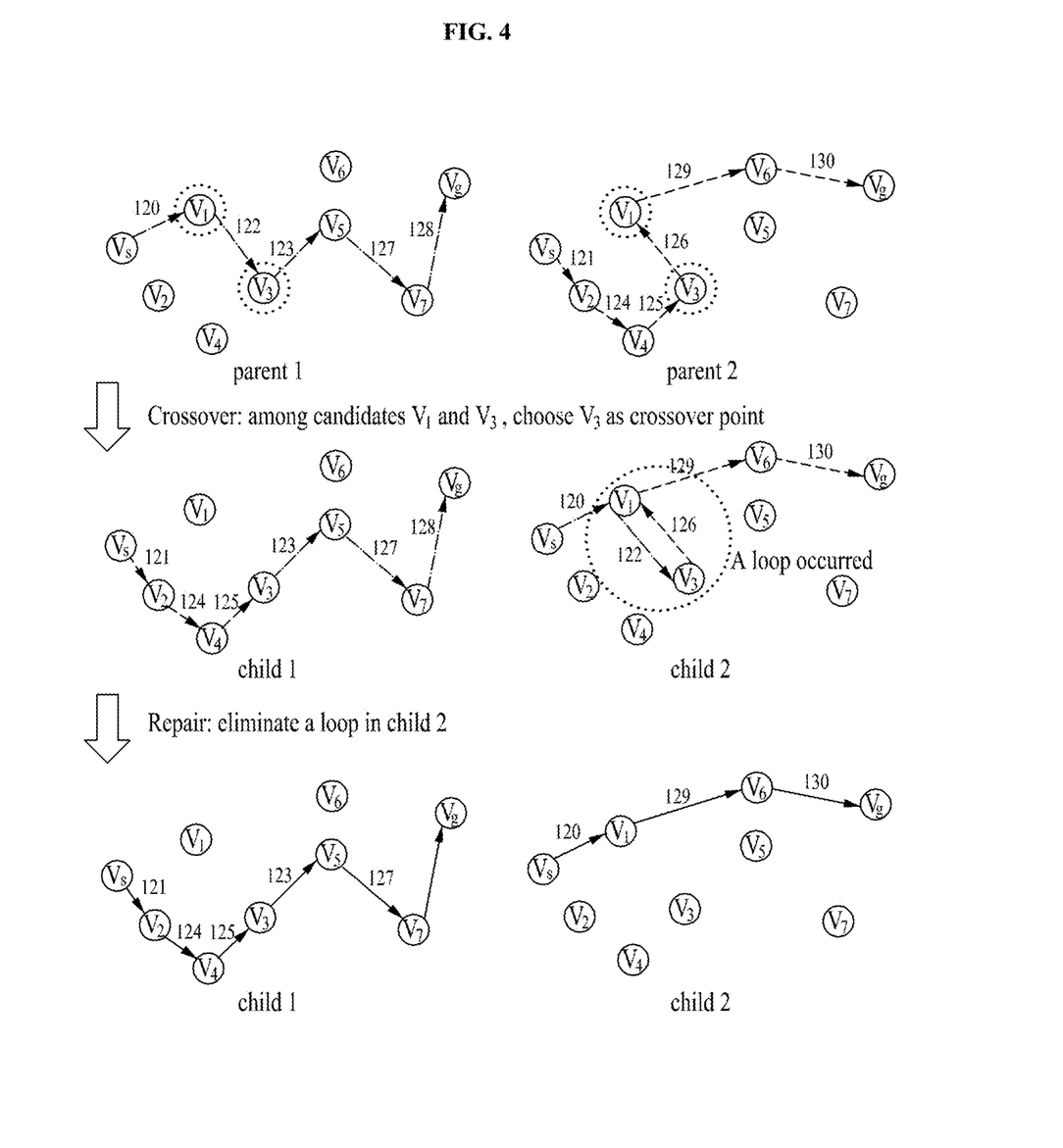
FIG. 4 is a diagram for describing a crossover process and repair process of the genetic algorithm according to various embodiments.

FIG. 4 illustrates such a repair process. FIG. 4 is a diagram for describing a crossover process and repair process of the genetic algorithm according to various embodiments. FIG. 4 illustrates that the path of the parent 1 and the path of the parent 2 share common vertices $V_1$ and $V_3$. Therefore, the common vertices $V_1$ and $V_3$ are candidates for a crossover point. The vertex $V_3$ is randomly selected as a crossover point, and one-point crossover is executed. As a result, the child 1 as well as the child 2 is generated, but the child 2 contains a loop that circulates the common vertices $V_1$ and $V_3$. Thus, a repair process is performed on the child 2 in order to eliminate the loop.

4.5. Mutation

A mutation process is to change a serving MEC server among MEC servers that cover an edge. A locus for mutation was randomly selected from a range of 0 to m. Prior to entering the above child chromosomes into the population, the mutation process was executed with a given probability.

4.6. Overall Procedure

Figure 5:
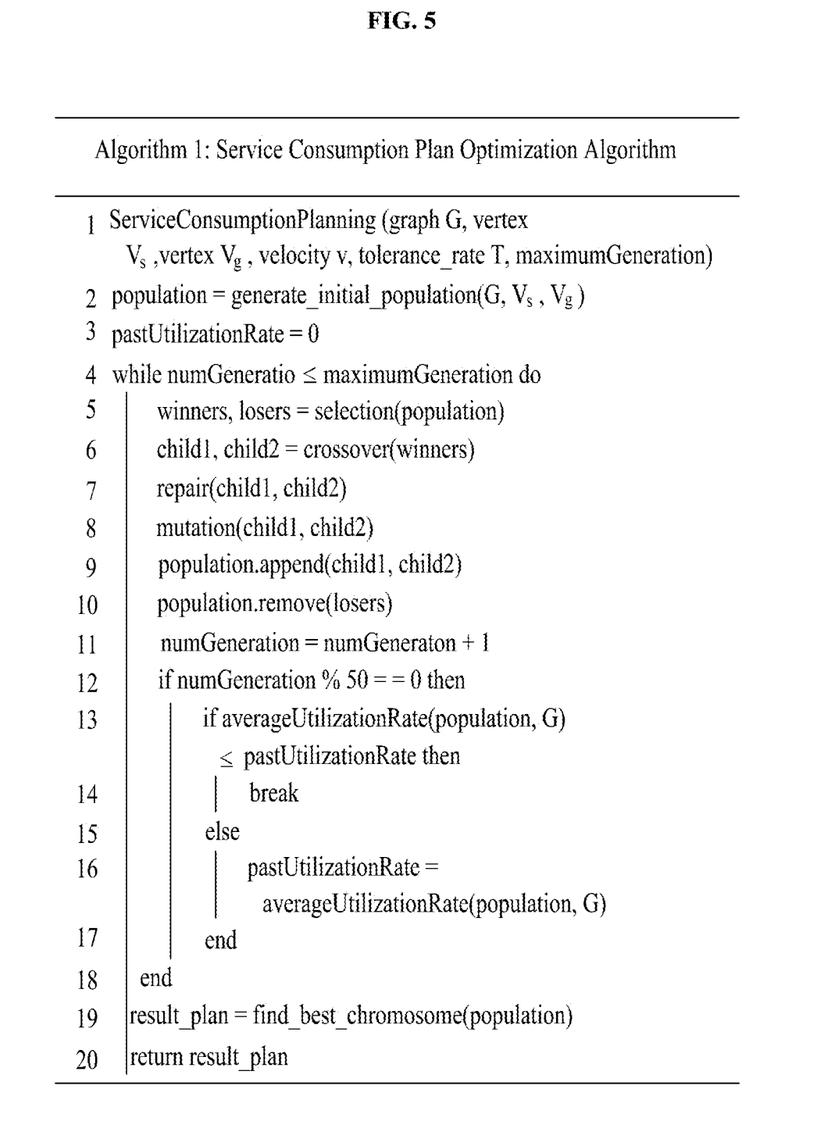
FIG. 5 is a diagram for describing an algorithm according to various embodiments.

In order to find a plan that efficiently utilizes MEC servers, the present disclosure propose a service consumption plan optimization algorithm based on the genetic algorithm. FIG. 5 is a diagram for describing an algorithm according to various embodiments. A pseudo-code of the algorithm is presented in Algorithm 1 of FIG. 5.

The algorithm takes a graph G, a vertex Vs, a vertex $V_9$, a velocity v, a tolerance rate T, and a maximumGeneration value as inputs, and returns a plan that maximizes a utilization rate. First, the population was initialized (Line 2 in Algorithm 1). Second, generations are iterated to find an optimized plan. In a generation, a child 1 and a child 2, that is, two new chromosomes, are reproduced and included in the population through selection, crossover, repair and mutation already described above (Lines 5 to 11 in Algorithm 1). This iteration is terminated when the number of generations exceeds maximumGeneration (Line 4 in Algorithm 1). In addition, when an average utilization rate (averageUtilizationRate) of the population is less than or equal to that of the population before a $50^{th}$ generation, the iteration is stopped (Lines 12 to 17 in Algorithm 1). Finally, among plans in the population, a plan having the highest utilization rate is found (Line 19 in Algorithm 1).

Figure 6:
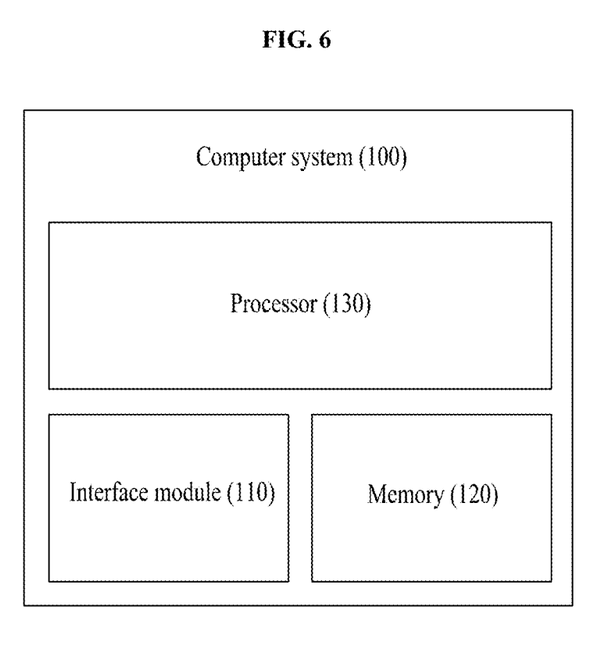
FIG. 6 is a diagram illustrating an internal construction of a computer system according to various embodiments.

FIG. 6 is a diagram illustrating an internal construction of a computer system 100 according to various embodiments.

Referring to FIG. 6, the computer system 100 according to various embodiments may include at least one of an interface module 110, a memory 120, or a processor 130. In some embodiments, at least one of the components of the computer system 100 may be omitted, and at least one other component may be added to the computer system 100. In some embodiments, at least two of the components of the computer system 100 may be implemented as a single integrated circuit.

The interface module 110 may provide an interface for the computer system 100. According to an embodiment, the interface module 110 includes a communication module. The communication module may perform communication with an external device. The communication module may establish a communication channel between the computer system 100 and the external device, and may perform communication with the external device through the communication channel. The communication module may include at least one of a wired communication module or a wireless communication module. The wired communication module is connected to the external device through wires, and may communicate with the external device through wires. The wireless communication module may include at least any one of a short-distance communication module or a long-distance communication module. The short-distance communication module may communicate with the external device by using a short-distance communication method. The long-distance communication module may communicate with the external device by using a long-distance communication method. In this case, the long-distance communication module may communicate with the external device over a wireless network. According to another embodiment, the interface module 110 may include at least one of an input module or an output module. The input module may input a signal to be used for at least one component of the computer system 100. The input module may include at least any one of an input device configured to enable a user to directly input a signal to the computer system 100, a sensor device configured to generate a signal by detecting a surrounding environment, or a camera module configured to generate image data by capturing an image. The output module may include at least one of a display module for visually displaying information or an audio module for outputting information in the form of an audio signal.

The memory 120 may store various data used by at least one component of the computer system 100. For example, the memory 120 may include at least any one of a volatile memory or a non-volatile memory. The data may include at least one program and input data or output data related to the program. The program may be stored in the memory 120 as software including at least one instruction.

The processor 130 may control at least one component of the computer system 100 by executing the program of the memory 120. Accordingly, the processor 130 may perform data processing or an operation. In this case, the processor 130 may execute an instruction stored in the memory 120.

The processor 130 may provide the service consumption plan for efficient service migration in a mobile edge computing (MEC) environment. That is, in order to provide a user with high quality services, the processor 130 may provide the service consumption plan for minimizing service migration latency during journey. To this end, the processor 130 may construct a graph representing edges indicating a plurality of road segments and a plurality of MEC servers covering the road segments. Furthermore, the processor 130 may detect the service consumption plan for maximizing a ratio of a utilized journey time, which is served through at least one of the MEC servers for a total journey time, with respect to paths between a starting vertex and a goal vertex set by a user by using the graph. In this case, the processor 130 may detect the service consumption plan by using the genetic algorithm. To this end, the processor 130 may operate like Algorithm 1 in FIG. 5. Accordingly, the processor 130 can provide the service consumption plan to the user.

Figure 7:
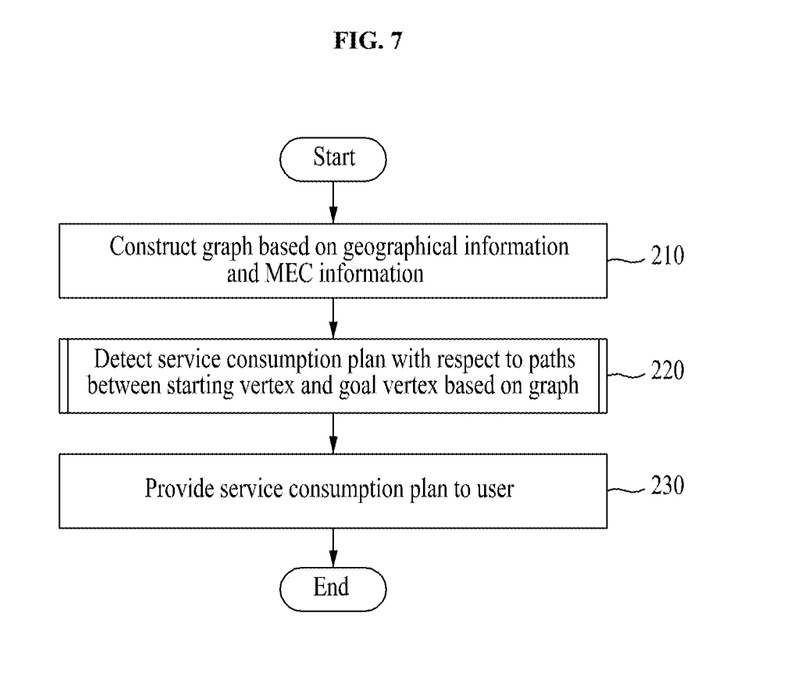
FIG. 7 is a diagram illustrating a method of the computer system according to various embodiments.

FIG. 7 is a diagram illustrating a method of the computer system 100 according to various embodiments.

Referring to FIG. 7, in step 210, the computer system 100 may construct a graph based on geographical information and MEC information. In this case, the MEC information may indicate information of each MEC server, and may include the property of each MEC server. The processor 130 may construct a graph representing edges indicating a plurality of road segments and a plurality of MEC servers covering the road segments. In this case, each of the edges may connect two vertices, and may be connected to an adjacent edge through one of vertices in the respective paths. In this case, the processor 130 may input at least one of a starting vertex, a goal vertex, a velocity, a tolerance rate, or a maximum generation number of a user along with the graph.

In step 220, the computer system 100 may detect a service consumption plan with respect to the paths between the starting vertex and the goal vertex based on the graph. The processor 130 may detect a service consumption plan for maximizing a ratio of a utilized journey time, which is served through at least one of the MEC servers for a total journey time, with respect to paths between the starting vertex and the goal vertex set by the user by using the graph. In this case, the processor 130 may detect the service consumption plan by using a genetic algorithm. This will be more specifically described with reference to FIG. 8.

Figure 8:
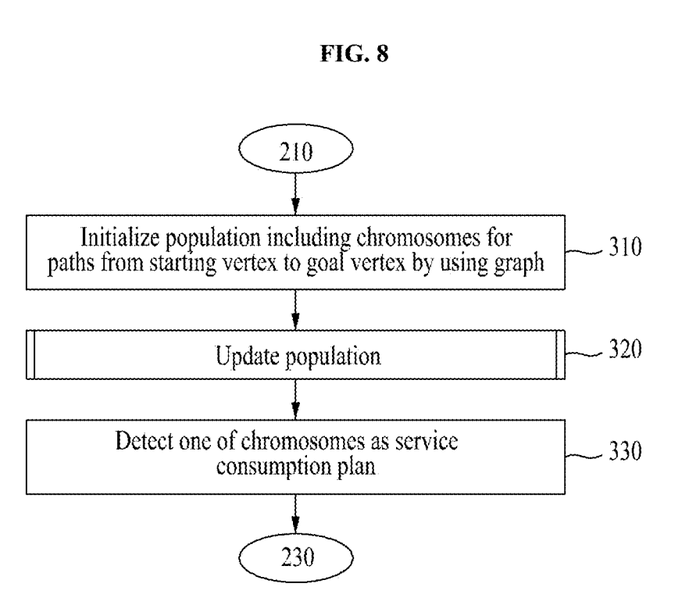
FIG. 8 is a diagram illustrating a step of detecting a service consumption plan in FIG. 7.

FIG. 8 is a diagram illustrating the step 220 of detecting the service consumption plan in FIG. 7.

Referring to FIG. 8, in step 310, the computer system 100 may initialize a population including chromosomes of the paths from the starting vertex to the goal vertex by using the graph. In this case, each of the chromosomes may be composed of a sequence of edges for each of the paths and at least one MEC server.

In step 320, the computer system 100 may update the population. The processor 130 may update the population based on the chromosomes generated using the genetic algorithm. In this case, the processor 130 may repeatedly update the population by a maximum generation number. Furthermore, whenever the population is updated, the processor 130 may check an average utilization rate based on a ratio of all the chromosomes of the population. This will be more specifically described with reference FIG. 9.

Figure 9:
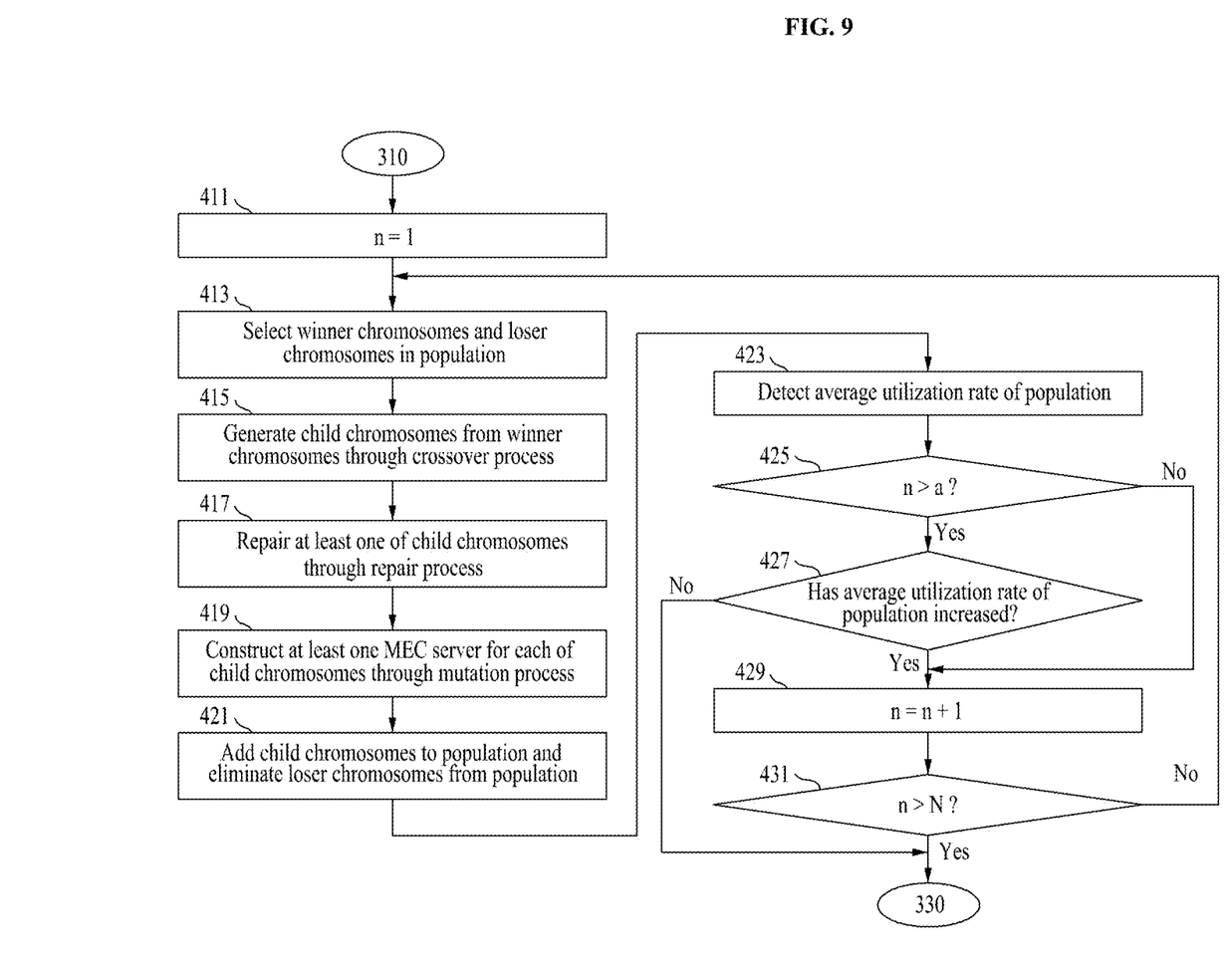
FIG. 9 is a diagram illustrating a step of updating a population in FIG. 8.

FIG. 9 is a diagram illustrating the step 320 of updating the population in FIG. 8.

Referring to FIG. 9, in step 411, the computer system 100 may set an update number "n" to 1.

In step 413, the computer system 100 may select winner chromosomes in a population. In this case, the processor 130 may select two winner chromosomes in the population. Furthermore, in step 413, the computer system 100 may select loser chromosomes in the population. In this case, the processor 130 may select two loser chromosomes in the population.

In step 415, the computer system 100 may generate child chromosomes from the winner chromosomes through a crossover process. The processor 130 may generate the child chromosomes by crossing over edges of the winner chromosomes based on common vertices of the winner chromosomes. Furthermore, in step 417, the computer system 100 may repair at least one of the child chromosomes through a repair process. The processor 130 may repair at least one of the child chromosomes by eliminating edges constituting a loop that circulates two vertices in at least one of the child chromosomes. Thereafter, in step 419, the computer system 100 may construct at least one MEC server for each of the child chromosomes through a mutation process. The processor 130 may construct at least one MEC server that covers the remaining edges with respect to each of the child chromosomes.

In step 421, the computer system 100 may add the child chromosomes to the population. Furthermore, in step 421, the computer system 100 may eliminate loser chromosomes from the population. Accordingly, the population may be updated.

In step 423, the computer system 100 may detect an average utilization rate of the population. The processor 130 may detect the average utilization rate based on a ratio of all the chromosomes of the population.

In step 425, the computer system 100 may determine whether an update number "n" is greater than a predetermined reference number "a." For example, the reference number "a" may be 50 times. In this case, the reference number "a" may be less than a maximum generation number N. If it is determined that the update number "n" is greater than the reference number "a" in step 425, in step 427, the computer system 100 may determine whether the average utilization rate of the population has increased during a previous reference number "a." For example, when the update number "n" is greater than 50, the processor 130 may determine whether a detected average utilization rate has increased during the past 50 times.

If it is determined that the average utilization rate of the population has not increased during the previous reference number "a" in step 427, the computer system 100 may return to FIG. 8 and proceed to step 330. That is, before the update number "n" reaches the maximum generation number N, the computer system 100 may return to FIG. 8 and proceed to step 330. In such a case, the time taken to update the population can be reduced.

If it is determined that the average utilization rate of the population has increased during the previous reference number "a" in step 427, the computer system 100 may proceed to step 429. If it is determined that the update number "n" is not greater than the reference number "a" in step 425, the computer system 100 may proceed to step 429.

In step 429, the computer system 100 may increase the update number "n" by 1. Furthermore, in step 431, the computer system 100 may determine whether the update number "n" is greater than the maximum generation number N.

If it is determined that the update number "n" is equal to or less than the maximum generation number N in step 431, the computer system 100 may return to step 413. Furthermore, the computer system 100 may repeatedly perform at least some of steps 413 to 431. In this way, the processor 130 may repeatedly update the population as many as the maximum generation number. Furthermore, whenever the population is updated, the processor 130 may check an average utilization rate based on a ratio of all the chromosomes of the population.

If it is determined that the update number "n" is greater than the maximum generation number N in step 431, the computer system 100 may return to FIG. 8 and proceed to step 330.

Referring back to FIG. 8, in step 330, the computer system 100 may detect one of the chromosomes of the population as a service consumption plan. The processor 130 may detect, as the service consumption plan, a chromosome having a maximum ratio, that is, a maximum utilization ratio, among the chromosomes of the population. Thereafter, the computer system 100 may return to FIG. 7 and proceed to step 230.

Referring back to FIG. 7, in step 230, the computer system 100 may provide the service consumption plan to the user.

According to various embodiments, the computer system 100 can provide a user with a service consumption plan for efficient service migration in an MEC environment. That is, the computer system 100 can provide the service consumption plan for minimizing service migration latency during journey in order to provide the user with high quality services. Specifically, the computer system 100 may detect a service consumption plan for maximizing a ratio of a utilized journey time, which is served through at least one of MEC servers for a total journey time, with respect to paths between a starting vertex and a goal vertex set by the user by using a graph. In this case, the computer system 100 may detect the service consumption plan by using a genetic algorithm. Accordingly, the computer system 100 can provide the user with the service consumption plan.

The present disclosure proposes a technology capable of helping, in using an MEC environment, people who use serves by using mobile phones as terminals or people who use services in vehicles. The present disclosure has an object of providing users with the greatest benefits of an MEC environment in providing services to the users who move in the MEC environment. Furthermore, the present disclosure includes a technology for proposing a path and thus may also be included in a navigation device for a vehicle, etc.

In order for an MEC environment to be successfully developed, moving users need to be helped so that he or she can effectively use MEC. Accordingly, when the service consumption plan is successfully delivered to the users, the market in which the users use the MEC environment can be further expanded.

Edge computing infrastructure is now being planned in many companies, and is actually in progress. In a coming MEC environment, a technology for increasing the utilization of MEC as in the present disclosure may be further in the spotlight. Furthermore, the self-driving era is not a vague future, but is the reality that will come soon. In a future self-driving era, many users will be freed from the duty of driving, and will use several services, such as watching YouTube, during driving. A value of the service consumption plan will become higher for the users.

The service consumption plan will be supplied to mobile phone users in the form of an application. The service consumption plan will be easily provided to the mobile phone users through an application. In a coming self-driving era, the technology of the present disclosure may be applied when a path is searched for in a navigation device for an autonomous vehicle.

A method of the computer system 100 according to various embodiments is for providing a service consumption plan for efficient service migration in a mobile edge computing (MEC) environment, and may include a step 210 of constructing a graph representing edges indicating a plurality of road segments and a plurality of MEC servers covering the road segments, a step 220 of detecting the service consumption plan for maximizing a ratio of a utilized journey time, which is served through at least one of the MEC servers for a total journey time, with respect to paths between a starting vertex and a goal vertex set by a user by using the graph, and a step 230 of providing the user with the service consumption plan.

According to various embodiments, the step 220 of detecting the service consumption plan may include detecting the service consumption plan by using a genetic algorithm.

According to various embodiments, the step 220 of detecting the service consumption plan may include a step 310 of initializing a population including chromosomes for the paths from the starting vertex to the goal vertex by using the graph, and a step 330 of detecting one of the chromosomes as the service consumption plan.

According to various embodiments, each of the chromosomes may include a sequence of edges for each of the paths and at least one MEC server.

According to various embodiments, each of the edges may connect two vertices and may be connected to an adjacent edge through one of the vertices in each of the paths.

According to various embodiments, the step 220 of detecting the service consumption plan may further include a step 320 of updating the population based on chromosomes generated using the genetic algorithm.

According to various embodiments, the step 320 of updating the population may include a step 420 of selecting two winner chromosomes in the population, a step 430 of generating two child chromosomes by crossing over the winner chromosomes, and a step 460 of adding the child chromosomes to the population.

According to various embodiments, the step 430 of generating child chromosomes may include a step 430 of generating the child chromosomes by crossing over edges of the winner chromosomes based on common vertices of the winner chromosomes, a step 440 of repairing at least one of the child chromosomes by eliminating edges constituting a loop that circulates two vertices in the at least one of the child chromosomes, and a step 450 of constructing at least one MEC server covering remaining edges with respect to each of the child chromosomes through a mutation process.

According to various embodiments, the step 320 of updating the population may further include a step 450 of selecting two loser chromosomes in the population and a step 460 of eliminating the loser chromosomes in the population.

According to various embodiments, the step 320 of updating the population may be repeated by a preset maximum generation number.

According to various embodiments, the step 220 of detecting the service consumption plan may further include a step of checking an average utilization rate based on a ratio of all the chromosomes of the population whenever the population is updated.

According to various embodiments, the step 330 of detecting one of the chromosomes as the service consumption plan may include steps of detecting the average utilization rate based on the ratio of all the chromosomes of the population, and detecting, as the service consumption plan, a chromosome having a maximum ratio among the chromosomes if the detected average utilization rate has increased from an average utilization rate checked during a predetermined reference number.

According to various embodiments, the reference number may be less than the maximum generation number.

The computer system 100 according to various embodiments is for providing a service consumption plan for efficient service migration in a mobile edge computing (MEC) environment, and may include the memory 120, and the processor 130 connected to the memory 120 and configured to execute at least one instruction stored in the memory 120.

According to various embodiments, the processor 130 may be configured to construct a graph representing edges indicating a plurality of road segments and a plurality of MEC servers covering the road segments, detect the service consumption plan for maximizing a ratio of a utilized journey time, which is served through at least one of the MEC servers for a total journey time, with respect to paths between a starting vertex and a goal vertex set by a user by using the graph, and provide the user with the service consumption plan.

According to various embodiments, the processor 130 may be configured to detect the service consumption plan by using a genetic algorithm.

According to various embodiments, the processor 130 may be configured to initialize a population including chromosomes for the paths from the starting vertex to the goal vertex by using the graph and to detect one of the chromosomes as the service consumption plan.

According to various embodiments, each of the chromosomes may include a sequence of edges for each of the paths and at least one MEC server.

According to various embodiments, each of the edges may connect two vertices and may be connected to an adjacent edge through one of the vertices in each of the paths.

According to various embodiments, the processor 130 may be configured to update the population based on chromosomes generated using the genetic algorithm.

According to various embodiments, the processor 130 may be configured to select two winner chromosomes in the population, generate two child chromosomes by crossing over the winner chromosomes, and add the child chromosomes to the population.

According to various embodiments, the processor 130 may be configured to generate the child chromosomes by crossing over edges of the winner chromosomes based on common vertices of the winner chromosomes, repair at least one of the child chromosomes by eliminating edges constituting a loop that circulates two vertices in the at least one of the child chromosomes, and construct at least one MEC server covering remaining edges with respect to each of the child chromosomes through a mutation process.

According to various embodiments, the processor 130 may be configured to select two loser chromosomes in the population and to eliminate the loser chromosomes in the population.

According to various embodiments, the processor 130 may be configured to repeatedly update the population by a preset maximum generation number, and check an average utilization rate based on a ratio of all the chromosomes of the population whenever the population is updated.

According to various embodiments, the processor 130 may be configured to detect the average utilization rate based on the ratio of all the chromosomes of the population and to detect, as the service consumption plan, a chromosome having a maximum ratio among the chromosomes if the detected average utilization rate has increased from an average utilization rate checked during a predetermined reference number.

According to various embodiments, the reference number may be less than the maximum generation number.

The aforementioned device may be implemented as a hardware component, a software component and/or a combination of a hardware component and software component. For example, the device and component described in the embodiments may be implemented using a processor, a controller, an arithmetic logic unit (ALU), a digital signal processor, a microcomputer, a field programmable gate array (FPGA), a programmable logic unit (PLU), a microprocessor or one or more general-purpose computers or special-purpose computers, such as any other device capable of executing or responding to an instruction. The processing device may perform an operating system (OS) and one or more software applications executed on the OS. Furthermore, the processing device may access, store, manipulate, process and generate data in response to the execution of software. For convenience of understanding, one processing device has been illustrated as being used, but a person having ordinary skill in the art may understand that the processing device may include a plurality of processing elements and/or a plurality of types of processing elements. For example, the processing device may include a plurality of processors or a single processor and a single controller. Furthermore, a different processing configuration, such as a parallel processor, is also possible.

Software may include a computer program, a code, an instruction or a combination of one or more of them and may configure a processing device so that the processing device operates as desired or may instruct the processing devices independently or collectively. The software and/or the data may be embodied in any type of machine, a component, a physical device, a computer storage medium or a device in order to be interpreted by the processor or to provide an instruction or data to the processing device. The software may be distributed to computer systems connected over a network and may be stored or executed in a distributed manner. The software and the data may be stored in one or more computer-readable recording media.

The method according to various embodiments may be implemented in the form of a program instruction executable by various computer means and stored in a computer-readable medium. In this case, the medium may continue to store a program executable by a computer or may temporarily store the program for execution or download. Furthermore, the medium may be various recording means or storage means having a form in which one or a plurality of pieces of hardware has been combined. The medium is not limited to a medium directly connected to a computer system, but may be one distributed over a network. Examples of the medium may be magnetic media such as a hard disk, a floppy disk and a magnetic tape, optical media such as a CD-ROM and a DVD, magneto-optical media such as a floptical disk, and media configured to store program instructions, including, a ROM, a RAM, and a flash memory. Furthermore, other examples of the medium may include recording media and/or storage media managed in an app store in which apps are distributed, a site in which various other pieces of software are supplied or distributed, a server, etc.

Various embodiments of this document and the terms used in the embodiments are not intended to limit the technology described in this document to a specific embodiment, but should be construed as including various changes, equivalents and/or alternatives of a corresponding embodiment. Regarding the description of the drawings, similar reference numerals may be used in similar elements. An expression of the singular number may include an expression of the plural number unless clearly defined otherwise in the context. In this document, an expression, such as "A or B", "at least one of A and/or B", "A, B or C" or "at least one of A, B and/or C", may include all of possible combinations of listed items together. Expressions, such as "a first," "a second," "the first" or "the second", may modify corresponding elements regardless of its sequence or importance, and are used to only distinguish one element from the other element and do not limit corresponding elements. When it is described that one (e.g., a first) element is "(functionally or communicatively) connected to" or "coupled with" the other (e.g., a second) element, one element may be directly connected to the other element or may be connected to the other element through another element (e.g., a third element).

The term "module" used in this document may include a unit implemented as hardware, software or firmware, and may be interchangeably used with a term, such as logic, a logical block, a part, or a circuit. The module may be an integrated part or a minimum unit in which one or more functions are performed or a part thereof. For example, the module may be implemented as an application-specific integrated circuit (ASIC).

According to various embodiments, each (e.g., a module or a program) of the aforementioned elements may include a single entity or a plurality of entities. According to various embodiments, one or more of the aforementioned components or steps may be omitted or one or more other components or steps may be added. Alternatively or additionally, a plurality of components (e.g., modules or programs) may be integrated into a single component. In such a case, the integrated component may identically or similarly perform a function performed by a corresponding one of the plurality of components before one or more functions of each of the plurality of components. According to various embodiments, steps performed by a module, a program or another component may be executed sequentially, in parallel, iteratively or heuristically, or one or more of the steps may be executed in different order or may be omitted, or one or more other steps may be added.

The embodiments of the invention in which an exclusive property or privilege is claimed are defined as follows:

1. A method of a computer system for providing a service consumption plan for efficient service migration in a mobile edge computing (MEC) environment, the method comprising:
    constructing a graph representing edges indicating a plurality of road segments and a plurality of MEC servers covering the road segments;
    detecting the service consumption plan for maximizing a ratio of a utilized journey time, which is served through at least one of the MEC servers for a total journey time, with respect to paths between a starting vertex and a goal vertex set by a user by using the graph; and
    providing the user with the service consumption plan.

2. The method of claim 1, wherein the detecting of the service consumption plan comprises detecting the service consumption plan by using a genetic algorithm.

3. The method of claim 2, wherein the detecting of the service consumption plan comprises:
    initializing a population comprising chromosomes for the paths from the starting vertex to the goal vertex by using the graph; and
    detecting one of the chromosomes as the service consumption plan.

4. The method of claim 3, wherein each of the chromosomes comprises a sequence of edges for each of the paths and at least one MEC server, and
    wherein each of the edges connects two vertices and is connected to an adjacent edge through one of the vertices in each of the paths.

5. The method of claim 3, wherein the detecting of the service consumption plan further comprises updating the population based on chromosomes generated using the genetic algorithm.

6. The method of claim 5, wherein the updating of the population comprises:
    selecting two winner chromosomes in the population;
    generating two child chromosomes by crossing over the winner chromosomes; and
    adding the child chromosomes to the population.

7. The method of claim 6, wherein the generating of the child chromosomes comprises:
    generating the child chromosomes by crossing over edges of the winner chromosomes based on common vertices of the winner chromosomes;
    repairing at least one of the child chromosomes by eliminating edges constituting a loop that circulates two vertices in the at least one of the child chromosomes; and
    constructing at least one MEC server covering remaining edges with respect to each of the child chromosomes through a mutation process.

8. The method of claim 6, wherein the updating of the population further comprises:
    selecting two loser chromosomes in the population; and
    eliminating the loser chromosomes in the population.

9. The method of claim 5, wherein updating the population is repeated by a preset maximum generation number, and
    wherein the detecting of the service consumption plan further comprises checking an average utilization rate based on a ratio of all the chromosomes of the population whenever the population is updated.

10. The method of claim 9, wherein the detecting one of the chromosomes as the service consumption plan comprises:
    detecting the average utilization rate based on the ratio of all the chromosomes of the population; and
    detecting, as the service consumption plan, a chromosome having a maximum ratio among the chromosomes if the detected average utilization rate has increased from an average utilization rate checked during a predetermined reference number,
    wherein the reference number is less than the maximum generation number.

11. A computer system providing a service consumption plan for efficient service migration in a mobile edge computing (MEC) environment, the computer system comprising:
    a memory; and
    a processor connected to the memory and configured to execute at least one instruction stored in the memory,
    wherein the processor is configured to:
    construct a graph representing edges indicating a plurality of road segments and a plurality of MEC servers covering the road segments,
    detect the service consumption plan for maximizing a ratio of a utilized journey time, which is served through at least one of the MEC servers for a total journey time, with respect to paths between a starting vertex and a goal vertex set by a user by using the graph, and
    provide the user with the service consumption plan.

12. The computer system of claim 11, wherein the processor is configured to detect the service consumption plan by using a genetic algorithm.

13. The computer system of claim 11, wherein the processor is configured to:
    initialize a population comprising chromosomes for the paths from the starting vertex to the goal vertex by using the graph, and
    detect one of the chromosomes as the service consumption plan.

14. The computer system of claim 13, wherein each of the chromosomes comprises a sequence of edges for each of the paths and at least one MEC server, and
    wherein each of the edges connects two vertices and is connected to an adjacent edge through one of the vertices in each of the paths.

15. The computer system of claim 13, wherein the processor is configured to update the population based on chromosomes generated using the genetic algorithm.

16. The computer system of claim 15, wherein the processor is configured to:
    select two winner chromosomes in the population;
    generate two child chromosomes by crossing over the winner chromosomes; and
    add the child chromosomes to the population.

17. The computer system of claim 16, wherein the processor is configured to:
    generate the child chromosomes by crossing over edges of the winner chromosomes based on common vertices of the winner chromosomes;
    repair at least one of the child chromosomes by eliminating edges constituting a loop that circulates two vertices in the at least one of the child chromosomes; and
    construct at least one MEC server covering remaining edges with respect to each of the child chromosomes through a mutation process.

18. The computer system of claim 16, wherein the processor is configured to:

select two loser chromosomes in the population, and eliminate the loser chromosomes in the population.

19. The computer system of claim 15, wherein the processor is configured to:
repeatedly update the population by a preset maximum generation number,
check an average utilization rate based on a ratio of all the chromosomes of the population whenever the population is updated,
detect the average utilization rate based on the ratio of all the chromosomes of the population, and
detect, as the service consumption plan, a chromosome having a maximum ratio among the chromosomes if the detected average utilization rate has increased from an average utilization rate checked during a predetermined reference number,
wherein the reference number is less than the maximum generation number.

20. A non-transitory computer-readable storage medium for storing one or more programs for providing a service consumption plan for efficient service migration in a mobile edge computing (MEC) environment,
wherein the programs executes:
constructing a graph representing edges indicating a plurality of road segments and a plurality of MEC servers covering the road segments;
detecting the service consumption plan for maximizing a ratio of a utilized journey time, which is served through at least one of the MEC servers for a total journey time, with respect to paths between a starting vertex and a goal vertex set by a user by using the graph; and
providing the user with the service consumption plan.

* * * * *